March 13, 1928.  1,662,739
T. S. CURTIS
METHOD OF HEAT TREATMENT OF ALUMINA AND OTHER MATERIALS
Filed April 7, 1925
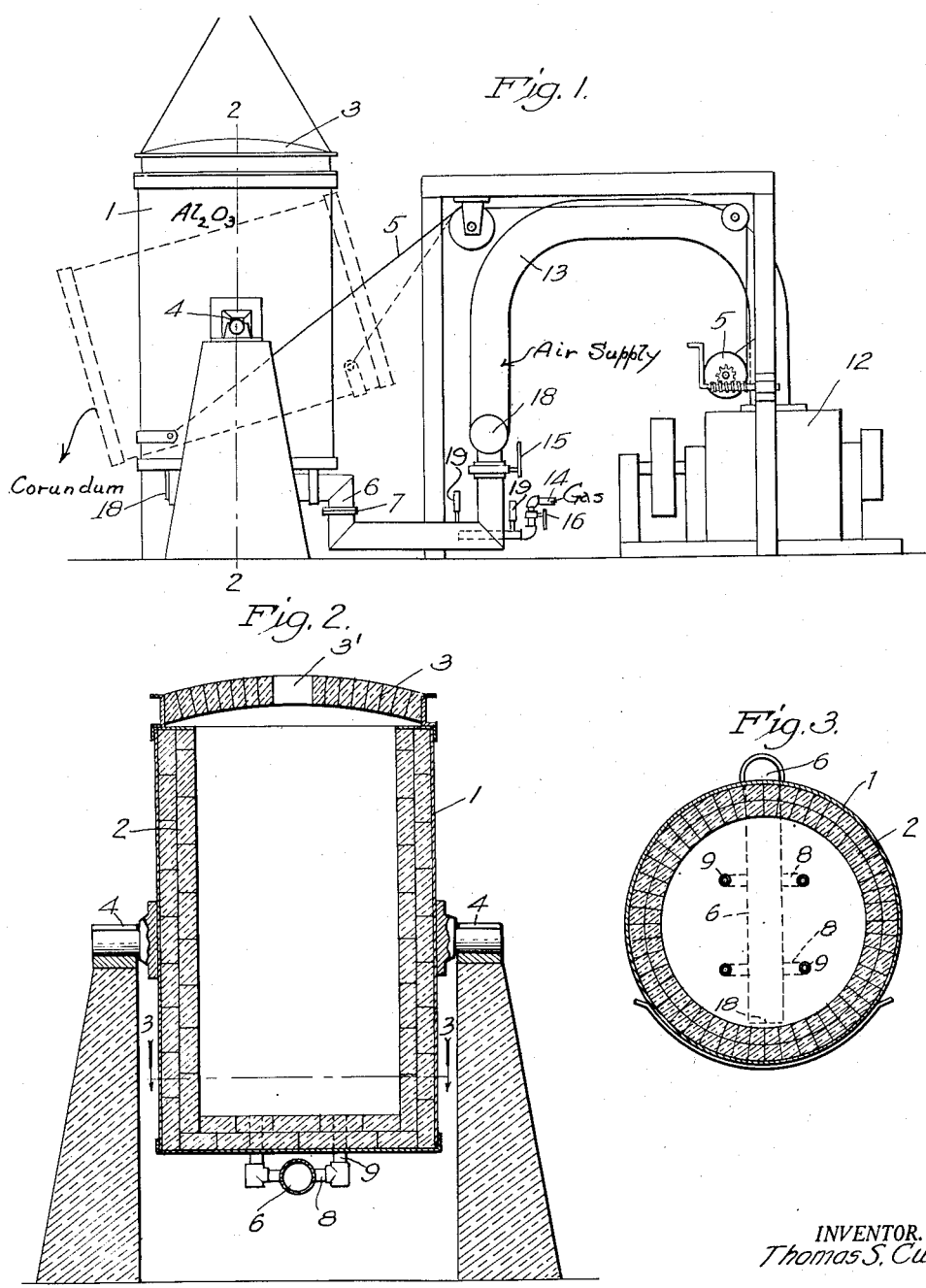
INVENTOR.
Thomas S. Curtis
BY Arthur P. Knight
ATTORNEY.

Patented Mar. 13, 1928.

1,662,739

UNITED STATES PATENT OFFICE.

THOMAS S. CURTIS, OF HUNTINGTON PARK, CALIFORNIA, ASSIGNOR, BY MESNE ASSIGNMENTS, TO PACIFIC-SOUTHWEST TRUST & SAVINGS BANK, TRUSTEE, OF LOS ANGELES, CALIFORNIA, A CORPORATION OF CALIFORNIA.

METHOD OF HEAT TREATMENT OF ALUMINA AND OTHER MATERIALS.

Application filed April 7, 1925. Serial No. 21,349.

This invention relates to a method of heating alumina or other metal oxides or other materials to a high temperature for the purpose of causing changes in structure, crystalline form, or other properties thereof. An important object of the invention is to accomplish the heating of such materials to a high temperature without the use of the electric furnace, thus permitting the production of a product having certain advantageous properties as hereinafter set forth.

Many materials which in certain forms are useful for abrasive, electrical insulation, or other purposes must be heated to an extremely high temperature in order to convert them into such useful forms. Alumina, for example, must be heated to a temperature of about 3500° F. in order to convert it to the form of corundum, in which form it is an excellent abrasive material. The methods heretofore employed of heating by combustion of gaseous or other fuel have in many cases failed to produce temperatures sufficiently high for such purposes and the electric furnace has therefore been generally employed in such cases. The use of the electric furnace however is subject to certain disadvantages in that the material being heated is oftentimes fused to a solid mass and a very hard coarsely crystalline body is produced which must be subsequently reduced with great difficulty to the desired size or state of division. Furthermore the operation of the electric furnace frequently results in the introduction into the product of various impurities which seriously impair the value of the material for the purpose for which it is to be used. Such impurities include carbon from the electrodes, and in some cases carbides formed by reaction between such carbon and the material being heated or between such carbon and iron and materials occuring as impurities in the material being heated.

I have found that by forming a fragmentary mass or body consisting of lumps or fragments of the material to be heated and burning an explosive mixture of combustible carbon-bearing gas in contact with such body to heat the same to a high temperature and deposit finely divided carbon throughout the same due to decomposition of the gas, and then passing air through the hot carbon-impregnated fragmentary body to oxidize such carbon, I am enabled to obtain extremely high temperatures and at the same time to avoid introduction into the product of objectionable impurities and obtain a product having other advantageous properties.

The accompanying drawings illustrate an apparatus suitable for carrying out my heating process and referring thereto:

Fig. 1 is a side elevation of such apparatus.

Fig. 2 is a vertical section through the converter, on line 2—2 in Fig. 1.

Fig. 3 is a horizontal section on line 3—3 in Fig. 2.

The converter or vessel in which the material is heated comprises preferably a vertical, cylindrical shell or casing 1 whose side and bottom walls are lined with suitable refractory or heat resistant material indicated at 2. The converter is open at its upper end to permit charging and emptying and is provided with a removable cover 3 constructed of or lined with refractory material for closing the upper end thereof during certain stages of the converter operation as hereinafter described, said cover having a suitable vent or opening 3'. Said converter is mounted to tilt in a vertical plane on horizontal axes or trunnions 4, suitable means indicated at 5 being provided for effecting such tilting operation. Supply means 6 are provided for mixing and supplying gas and air to the converter, said supply means having a detachable connection 7 adapted to be disconnected so as to permit tilting of the converter. Said supply means 6 is connected by suitable branch pipes 8 to tuyères 9 extending through the bottom of the converter and adapted to supply or introduce gas and air into the converter. Suitable means are provided for producing a supply of air under pressure, such means comprising, for example, an air compressor or blower 12 connected by pipe 13 to the mixing and supply means 6. Gas supply means indicated at 14 are also provided for introducing into said supply means 6 the supply of the fuel gas. Said air and gas supply means 13 and 14 are provided with suitable valve means indicated at 15 and 16 respectively. Suitable means such as friction plugs or caps 18 may be provided at suitable points in the air supply pipe and in the fuel and air supply means 6 for preventing dangerous explosions, such plugs or caps being fitted comparatively loosely in place and adapted to be blown out in case of explosion, thus preventing damage to any parts of the apparatus.

My method of heat treatment is of great advantage in connection with the heating of alumina or aluminum oxide to convert the same to the form of corundum. In this case the raw material used will depend upon the purpose for which the product is to be used and upon the requisite purity thereof. For the preparation of the highest grade pure corundum, I prefer to use as a raw material, alumina substantially free from impurities, which may be obtained on the market or may be produced by purification of alumina-containing ore such as bauxite, diaspore, or alunite. The purification may be accomplished where necessary by heating the raw material with sodium carbonate to form sodium aluminate, separating this from insoluble impurities such as iron oxide by dissolving in water, and then precipitating by passing carbon dioxide through the solution. Any other of the well known methods of purification may be employed however. In some cases a small percentage of silica in the raw material is not harmful and may be allowed to remain, such silica combining with the alumina during the heat treatment and appearing in the final product in the form of mullite ($3Al_2O_3.2SiO_2$), or other form of aluminum silicate. When the material is obtained as a precipitate in the purification treatment above mentioned or when bought in the form of pure alumina it is generally in finely divided form. In any case however, when the material is not in a state of fine division I prefer to reduce the same to a suitable state of division for molding. The finely divided alumina must then be converted to the form of fragments or lumps, and for this purpose I prefer to mix the same with sufficient water and mold to the form of briquettes or blocks of suitable size for example of approximately the size of ordinary building block. These briquettes may then be dried in any suitable manner before charging into the converter. In some cases I may prefer to cast or mold the finely divided material into larger blocks and then after drying these blocks, break or crush the same to form fragments or lumps of suitable size for example 2 to 4 inches for charging into the converter. In other cases when the natural ore is in a sufficiently high state of purity or when the highest degree of purity in the final product is not essential the ore may simply be broken up to the form of lumps or fragments of suitable size for example as above mentioned, for charging in this form into the converter without requiring any reducing and briquetting operation. In any case however the material must be brought to a fragmentary condition.

The fragments or aggregates so obtained are then charged into the converter until it is substantially full, the only precaution necessary during this charging operation being to insert rods or bars in the openings of of the tuyères 9 at the bottom of the converter at the start of the charging operation so as to prevent covering of such openings by any of the fragments of the material. The bars used for this purpose are removed as soon as the first portion of the charge is placed.

The converter operation may be divided into two principal periods. The first, which may be called the gas or ignition period, consists in burning an explosive mixture of natural gas or other combustible carbon-bearing gas and air in the converter, which in many respects is similar to a typical Bessemer converter as used in the steel industry. In starting the converter, gas is admitted through pipes 14 and 6, without air, and ignited at the top of the converter. As soon as free combustion is established the air valve 15 is opened until an explosive mixture is obtained which is immediately manifested by a mild explosion which extinguishes the free burning gas flame at the top of the converter and promotes the combustion without visible flame down inside the charge within the converter. The proportions of air and gas necessary for this combustion are readily calculated if the composition and B. t. u. value of the gas are known. In the case of a typical Southern California natural gas having a value of approximately 1150 B. t. u. the proportions of gas to air for perfect combustion are as 1 to 10.7. In order to ensure sufficient deposition of carbon throughout the mass as hereinafter described however I prefer in general to use a mixture containing a slight excess of gas. For this purpose the ratio of gas to air may be maintained for example at 1 to 10. This desired mixture may be controlled for example by means of low pressure direct reading manometers 19 which read in ounces of pressure per square inch. Air is supplied by a positive pressure blower or other means 12 operating preferably at from 1½ to 2 pounds to the square inch. Gas is delivered to the furnace at a suitable pressure for example approximately 6 pounds per square inch ahead of the control valve. The actual gas pressure registering on the gauge beyond the control valve is maintained for example at six ounces above the air pressure. This relation is, of course, established by the size of the air supply pipe and the orifices through which the gas passes into the mixing chamber or supply pipe 6. The relation of these openings is purposely designed to maintain constantly a higher gas pressure than air pressure at the orifices adjacent the mixing point to prevent air passing back into the gas pipe line, and thus prevent danger of explosions in the gas line. The friction caps 18 above described serve to prevent serious damage in case of explosion within the mixing chamber 6. Such explosion hazards have however virtually been eliminated by reducing the size of the tuyères 9 and increasing the velocity of the explosive mixture until the velocity through these tuyères was found to be greater than the rate of flame propagation.

Once the combustion has been started the operation of the converter is characterized by extreme simplicity, the fact that combustion is taking place being manifested solely by a roaring sound from within the converter. Usually for the first two to three hours of the operation no flame whatever is visible in the converter, and usually after three hours a color appears at the top of the converter and a trace of yellow or greenish-yellow flame shows above the charge. After about four hours and from that time until near the end of the first stage of the operation, a slow but continuous settling of the charge is manifested. During the remainder of this gas period, as it is called, a further amount of fragmentary charge can be added to that originally placed in the converter, due to the settling of the charge brought about by the partial fusion or softening thereof and the reaction occurring therein. During all the above stages of the operation of the converter, the removable cover 3 is left off, leaving the upper end of the converter open. Usually after six to fourteen hours of operation the portable cover 3 is placed on the converter to complete the burning of the charge at the extreme top of the vessel. The balance of the gas period, which in total comprises from ten to twenty hours or longer, is then merely an operation of quiet combustion.

It will be seen that during the above described gas period an explosive mixture of combustible carbon-bearing gas and air is supplied to the bottom of the bed of fragmentary material in the converter and the combustion of this mixture takes place at the surfaces of such material throughout the converter. It is a well-known fact that the type of combustion thus produced, which is known as surface combustion, produces much higher temperatures than can be obtained when the same gas and air mixture is burned in an open flame. The entire mass of fragmentary material is thus raised to a high temperature, this temperature being at or near that at which the alumina is converted to the form of corundum. I have found however that if the heating operation is stopped at the end of the gas or ignition period the conversion to corundum is incomplete and the product is discolored due to the presence of carbon throughout the fragments or lumps of material in the converter. This carbon is deposited within the lumps during the combustion due to decomposition and incomplete combustion of the gas. I prefer therefore and in general find it necessary for the production of a satisfactory product to follow the above described gas period by an air or blast period which constitutes the second phase of the converter operation.

For this purpose at the conclusion of the gas period the gas is turned off and air alone is admitted from the blower for a suitable length of time, for example from two to eight hours, the cover 3 being left on during this stage of the operation. The first part of this blast period is characterized by a distinct raise in temperature and the mass of fragmentary material remains red-hot during substantially all of the blast period. This indicates the evolution of a considerable amount of heat during this period and this I believe to be due to the oxidation of the carbon deposited within the lumps of the material. The heat thus developed is not only very intense but is developed in intimate contact with the material and throughout the entire body thereof and results in a very complete conversion of the alumina to the form of corundum.

At the end of a suitable length of time which is determined by experience and by the appearence and behavior of the material in the converter the air blast is discontinued. The material within the converter which now consists substantially of alumina in the form of corundum and of a degree of purity corresponding to the purity of the raw material charged into the converter is then removed from the converter by tilting the same either with or without allowing the charge to cool before removal. In practice in order to conserve time and immediately make the converter available for a new operation I prefer to tilt the converter and remove the material therefrom immediately after the blast period without allowing it to cool.

The material as discharged from the converter comprises substantially fragments or lumps of the same shape and size as the material charged into the converter, but the crystalline form or structure of the material of which these lumps or fragments is composed is entirely changed by the heat treatment. A hand sorting operation may be used at this time, to separate discolored or apparently insufficiently heated fragments from the remainder, such insufficiently heated material usually occuring only at the extreme top and bottom of the converter charge, and therefore being easily detected and separated. For use as an abrasive the material after this sorting operation may be crushed and ground in any suitable manner to the desired state of division for example to approximately 60 to 100 mesh or to any desired grain size preferably between 40 mesh and fines. In this connection it should be noted that the crystals of corundum obtained by the above described method of conversion are relatively small and the fragments may therefore be easily broken up to the desired size without having to break up and destroy the structure of the individual crystals thus preserving in the finished ground product the sharp edges of the crystals and increasing the efficiency of the material as an abrasive. This is an important distinction between the product formed by my process and the product formed ordinarily in the electric furnace. In the latter case the corundum as discharged from the furnace is usually in the form of coarse crystals and in order to reduce the material to the desired state of division for use as an abrasive these individual crystals must not only be separated but must be broken up into smaller particles. This not only adds to the difficulty of reducing the electric furnace product since it is much harder to disintegrate the crystals themselves than to destroy the relatively loose bond between adjacent crystals, but it also reduces the efficiency of the material as an abrasive due to the destruction of the sharp edges of the crystals and the production of a large amount of fines which inevitably results from the hard grinding which is necessary in such cases. Such fines if left in the product reduce its efficiency as an abrasive, or if removed by screening they represent a considerable waste of material which must either be discarded or returned to be mixed with the raw material.

The reduction of the converter product to the desired state of division may be effected in any suitable manner, for example it may be ground in a ball mill or pebble mill. Since it is composed of relatively small crystals which are not strongly adherent to one another, it may easily be reduced in this manner without production of a large amount of fines. After grinding, the material may, if desired, be subjected to a magnetic separating operation to remove mill iron introduced during grinding, and may also be screened or graded as to grain size in any suitable manner, after which the product is ready for use as a very high grade abrasive.

The heating process above described consists as stated of two principal periods or phases: First the combustion in contact with the surfaces of the lumps or fragments of alumina, of an explosive mixture of gas and air, whereby the entire mass is heated to a high temperature and finely divided carbon is deposited throughout the lumps or fragments; and second passing air through and in contact with the surfaces of the resulting hot body of material causing the deposited carbon to be burned throughout the material which in turn causes a further rise in temperature and a substantially complete conversion of the alumina to the crystalline form of corundum. It is apparent that during the first period the combustion takes place not only at the surface of the fragments but to some extent at least within the voids inside the fragments themselves, for the deposition of finely divided carbon takes place practically homogeneously throughout such fragments. This indicates that the fragments or lumps of which the charge is made up are finely porous and therefore gas-permeable. In the same way the oxidation of this carbon during the air blast period takes place throughout and in intimate contact with substantially the entire mass of material. I have found that a higher temperature can be attained by first burning a mixture slightly deficient in oxygen so as to deposit carbon in the charge and then burning out this carbon with a blast of air than can be attained by simple combustion of an approximately perfect mixture of gas and air in and around the charge. Whether the deposition of carbon and its subsequent removal by air blast is of benefit only because of the high temperature thus produced or whether the reaction thus obtained has some catalytic effect in promoting the conversion of the alumina to the form of corundum, I can not state with certainty, but tests have shown a much more complete conversion when the process is carried out as above described than when the alumina is heated by any other means known to me, with the possible exception of electric furnaces. The production of corundum in the electric furnace on the other hand is subject to the disadvantages above set forth, namely the contamination of the product by the impurities, such as carbides, inevitably resulting from the electric furnace operation and the increased difficulty of milling the product to the desired size without production of a large proportion of fines. By my improved method of production the introduction of carbides or other impurities into the product is entirely eliminated, since the only foreign materials which come in contact with the product during the heating operation are the gas and air and the refractory lining material of the converter. This refractory lining should be substantially free from iron or other impurities which are apt to contaminate the product. The refractory lining of converter may for example advantageously comprise refractory bricks of magnesium-aluminate. It is to be noted however that any possible contamination which might result from the converter lining even with the use of the purest materials therein would be confined to a comparatively small proportion of the entire converter charge and the portion thus contaminated could easily be separated in the subsequent sorting operation and even if not removed would have no appreciable effect on the composition of the entire mass. I have not been able to determine with accuracy the exact temperature attained in the converter operation but such measurements as have been made indicate that this temperature is approximately ceramic cone 40 or 3506° F. I do not wish to be limited therefore to any exact temperature but may employ any temperature which may be obtained by the above-described method and which is sufficient under the conditions set forth to cause substantially complete conversion of the alumina to the form of corundum.

While I have described the application of my improved method of heat treatment to the production of corundum it may also be used with great advantage in the production of many other materials produced at high temperatures and in which it is desired to avoid as far as possible the introduction of impurities or other disadvantages such as result from treatment in an electric furnace. For example my method of heat treatment may advantageously be used in the conversion of magnesia to the crystalline form of periclase. The operation in such case comprises forming a bed or body of fragments or lumps of substantially pure magnesia and burning an explosive mixture of gas and air in intimate contact with such bed of material so as to heat the same to a high temperature and cause deposition of carbon throughout the same, and passing air through such hot body of fragmentary material to burn out the deposited carbon and thus generate sufficient heat to cause substantially complete conversion of the magnesia to the form of periclase. The method of operation is substantially the same as above described in connection with the production of corundum and is described more in detail in my application for patent for magnesia product and process of making the same, filed of even date herewith.

As further examples of materials which may be subjected to my improved method of heat treatment, I may mention chrome ore zircon, and clay but it is difficult to name all the possibilites or to set forth any particular class of materials with which this method of heat treatment may be of advantage. In general, however, it may be applied to any material which is capable of being brought to fragmentary condition so as to provide the requisite fragmentary bed or body of material, and is of greatest advantage in connection with materials which, when brought to such fragmentary condition, are minutely porous or of somewhat open structure within the fragments themselves (as distinguished from the close, impervious structure of metals, etc.) so as to permit diffusion of the gas mixture throughout the entire mass and uniform deposition of carbon therein.

While I have mentioned passing air alone through the fragmentary body during the second period of the operation, my invention should be understood to include the use of any oxidizing gas for this purpose. For example, I prefer in some cases to carry out the operation by first burning in contact with the material a mixture of gas and air having a deficiency of air below that required for complete combustion so as to cause deposition of carbon as above described, and then burning a mixture of gas and air containing an excess of air so as to maintain some gaseous combustion in the body of material while at the same time permitting the excess air to not only prevent further deposition of carbon but also oxidize the previously deposited carbon and thus produce a very high temperature. In such cases, the proportion of gas admitted with the air during the second period may be varied, as found most advantageous in any particular case, from zero up to the maximum proportion which may be used and yet maintain a mixture sufficiently oxidizing to oxidize deposited carbon.

While I prefer to carry out my method of heating in two periods or stages as above described, one important and novel feature of my invention, namely the fact that the material is heated directly by surface combustion taking place on the surface or within the pores of the fragments themselves, is of advantage independent of the two-stage combustion. For example the fragmentary body of material, formed as above described, may in some cases be heated by simple combustion in direct contact therewith of an explosive mixture of gas and air, and preferably a mixture containing a slight excess of air so as to ensure complete combustion and prevent deposition of carbon in the material. It should be noted that in this case, as well as when using the two-stage operation above described, the material to be treated is also used as the material for furnishing the combustion surface, and that the heat of combustion is therefore produced in intimate contact with the material to be treated and is utilized substantially for producing the desired change in such material, thus ensuring the most effective utilization of the heat. This is to be distinguished from the ordinary surface combustion furnaces, in which the material to be heated is enclosed or placed in a suitable chamber, such as an oven or muffle, which is in turn surrounded by or in heat exchanging relation with a bed of fragmentary material in which a mixture of gas and air is burned. In furnaces of that type the fragmentary combustion-promoting material is entirely separate from the material to be treated, and is provided solely for the purpose of furnishing an extended surface for combustion.

As stated above, however, I prefer in general to carry out my process in two stages, first with a deficiency of air so as to deposit carbon in the material, and then with an oxidizing gas to oxidize such carbon, as I find that a higher temperature may be attained by this means than by simple combustion of a mixture of gas and air in the fragmentary body of material. When so conducted in two stages my method of combustion may be used not only for the purpose of heating the fragmentary material itself, but for the purpose of producing heat by the combustion of gaseous fuel for any other suitable purpose as well. For example, this two-stage method of heat production may be used in connection with surface combustion furnaces of the type mentioned above. For this purpose a muffle or heating chamber of refractory material may be surrounded or placed in contact with a bed of fragmentary material, such as fragmentary alumina or other refractory material. Such bed of fragmentary material is enclosed in any suitable furnace or housing. The material to be treated is then placed in the heating chamber, and an explosive mixture of gas and air passed into contact with the bed of fragmentary material and caused to burn on the surfaces of such material. The mixture so burned has insufficient air for perfect combustion so that, while the fragmentary bed is heated to a high temperature, finely divided carbon is caused to be deposited throughout such material as above described. At the end of a suitable period, an oxidizing gas, for example either air alone or a gas and air mixture containing an excess of air, is passed through the heated fragmentary material, whereby the previously deposited carbon is oxidized and a very high temperature is produced. The heat developed in the bed of fragmentary material is then transferred by conduction, radiation and convection, to the heating chamber so as to heat the same, together with the contained material to be treated. In this case the material to be treated is not heated as effectively or as economically as in the direct contact method above described in which the combustion takes place in a fragmentary bed of such material itself, but this indirect method of heating is applicable to treatment of materials which must not be exposed to direct contact with air or combustion gases, for example when the material must be heated in a non-oxidizing atmosphere. Certain advantages to be derived from the two-stage method of combustion, and especially the unusually high temperatures obtainable by the combustion of the deposited carbon during the second stage, are however realized to a considerable extent in this indirect method of heating for the same reasons as in the direct contact methods above described.

What I claim is:

1. The method of heat treatment of difficultly fusible solid materials which comprises burning an explosive mixture of gas and air in intimate contact with a body of such material to heat the same to a high temperature and cause deposition of carbon therein and then forcing a blast of air through said body of material to oxidize such deposited carbon and heat the body of material to a higher temperature.

2. The method of heat treatment of difficultly fusible solid materials which comprises forming a fragmentary body of material to be treated, burning an explosive mixture of gas and air in contact with said body of material to heat the same to a high temperature and cause deposition of carbon therein and then passing air through the resulting hot body of material to oxidize such deposited carbon and heat the body of material to a higher temperature.

3. The method of heat treatment of difficultly fusible solid materials which comprises burning an explosive mixture of carbon-bearing gas and air in contact with a fragmentary bed of the material to be treated, said mixture having insufficient oxygen for complete combustion of the gas, so as to heat said bed of material to a high temperature and cause deposition of carbon therein, and then passing air through the resulting hot bed of material to oxidize such deposited carbon and heat the bed of material to a higher temperature.

4. The method of heat treatment of alumina which comprises burning an explosive mixture of gas and air in intimate contact with a body of alumina to heat the same to a high temperature and causes deposition of carbon therein, and then passing air through said body of alumina to oxidize such carbon and convert the alumina substantially to the form of corundum.

5. The method of heat treatment of alumina which comprises forming a body of alumina in fragmentary condition, burning an explosive mixture of carbon-bearing gas and air in contact with said body of alumina to heat the same to a high temperature and cause deposition of carbon therein and then passing air through said body of alumina to oxidize such deposited carbon and cause the alumina to be converted to the form of corundum due to the heat developed by such oxidization.

6. The method of heat treatment of difficultly fusible solid materials which comprises burning an explosive mixture of carbon-bearing gas and air in contact with a fragmentary bed of the material to be treated, said mixture having insufficient oxygen for complete combustion of the gas, so as to heat said bed of material to a high temperature and cause deposition of carbon therein, and then passing an oxidizing gas through the resulting hot bed of material to oxidize such deposited carbon to heat the material to a higher temperature.

7. The method of heat treatment of difficultly fusible solid materials which comprises burning in direct contact with a fragmentary bed of such material an explosive mixture of carbon-bearing gas and air in which the proportion of air is such as to cause deposition of carbon in the material, and then passing an oxidizing gas through such material to oxidize the carbon so deposited.

8. The method of heat treatment of difficultly fusible solid materials which comprises forming a fragmentary body of material to be treated and burning an explosive mixture of gas and air in direct contact with such fragmentary body to heat the same and cause a change in the properties thereof.

9. The method of producing heat by the combustion of gas which comprises burning an explosive mixture of carbon-bearing gas and air in contact with a fragmentary body of refractory material, the proportion of air in such mixture being insufficient to cause complete combustion of the gas, so as to heat said body of material to a high temperature and cause deposition of carbon therein, and then passing an oxidizing gas through such heated body material to oxidize the deposited carbon to heat the material to a higher temperature.

10. The method of producing heat by the combustion of gas which comprises burning an explosive mixture of carbon-bearing gas and air in contact with a fragmentary body of refractory material, the proportion of air in such mixture being sufficient to cause complete combustion of the gas, so as to heat said body of material to a high temperature and cause deposition of carbon therein, and then passing air through such heated body of material to oxidize the deposited carbon to heat the material to a higher temperature.

11. The method of heat treatment of difficultly fusible solid materials which comprises reducing the material to be treated to finely divided condition, aggregating such material to the form of porous fragments, then forming a bed of such porous fragments, burning an explosive mixture of gas and air in direct contact with the resulting fragmentary bed, and utilizing the heat thus produced substantially for the purpose of causing a change in such material.

In testimony whereof I have hereunto subscribed my name this 28th day of March 1925.

THOMAS S. CURTIS.